United States Patent
Bedjai et al.

[15] 3,688,268

[45] Aug. 29, 1972

[54] ELECTRONIC REMOTE CONTROL DEVICE UTILIZING MODULATED TRANSMISSION OF MAGNETICALLY RECORDED SIGNALS FILTERED IN A RECEIVER

[72] Inventors: Claude A. Bedjai, 3, rue du Plessis Piquet, 92 Clamart; Pierre N. Antoine, Residence des Trois Forets, 78 Bougival, both of France

[22] Filed: Aug. 10, 1970

[21] Appl. No.: 62,443

[30] Foreign Application Priority Data

Aug. 11, 1969 France ......................6927502

[52] U.S. Cl. .............340/147 P, 179/100.2 S, 222/2, 235/61.11 D, 235/61.12 M, 325/37, 340/148, 340/171 PF, 343/225, 346/33 MC

[51] Int. Cl. ..................................................H04q

[58] Field of Search.......340/147 R, 147 P, 339, 224, 340/221, 224; 235/61.7 B, 61.11 D, 61.12 M; 179/100.2 R, 100.2 Z, 100.2 S; 346/33 MC; 325/37; 343/225; 222/2

[56] References Cited

UNITED STATES PATENTS

| | | | |
|---|---|---|---|
| 3,312,372 | 4/1967 | Cooper | 222/2 |
| 2,979,706 | 4/1961 | Simon et al | 340/224 |
| 2,332,775 | 10/1943 | Bell | 340/221 |
| 2,717,086 | 9/1955 | Bush | 346/33 MC |
| 788,728 | 5/1905 | Poulsen | 179/100.2 R |
| 1,326,727 | 12/1919 | Hammond | 340/171 PF |
| 1,706,731 | 3/1929 | Hammond | 340/147 P |
| 2,038,647 | 4/1936 | Clausen | 235/61.11 D |
| 2,254,933 | 9/1941 | Bryce | 235/61.11 D |
| 3,287,543 | 11/1966 | Halpern | 235/61.12 M |
| 3,212,615 | 10/1965 | Hellar | 235/61.7 B |

*Primary Examiner*—David L. Trafton
*Attorney*—McGlew and Toren

[57] ABSTRACT

The device is operable to activate, and maintain activated for a predetermined time period, a consumer-controlled apparatus, such as a goods dispensing apparatus. The device includes a self-contained signalling unit in the form of a lightweight, easily portable, cassette type magnetic tape reproducing unit in which a tape is wound from a supply reel to a take-up reel responsive to actuation of a start button. A series of coded signals are recorded along a predetermined length of the tape and correspond to programmed information, and the tape may have two tracks. A respective pick-up or reading head is associated with each track and is connected to a respective radio signal transmitter. After the tape passes the reading heads, it passes beneath an erase head and a filter head which, respectively, erase the recorded information and erase all random noises and spurious signals. The radio signal transmitters are high frequency transmitters which are crystal controlled as to their respective frequencies, and the information from the reading heads is supplied as low frequency modulations to the transmitted high frequency signals. A receiving unit includes respective receivers each tuned to one of the two transmitters and each followed by a respective modulator and a respective selective filter. The currents from the two filters operate associated relays which are operable to close switches in an activating circuit for the controlled apparatus, and to maintain the switches closed as long as signals are received by the receiver.

4 Claims, 1 Drawing Figure

PATENTED AUG 29 1972 3,688,268
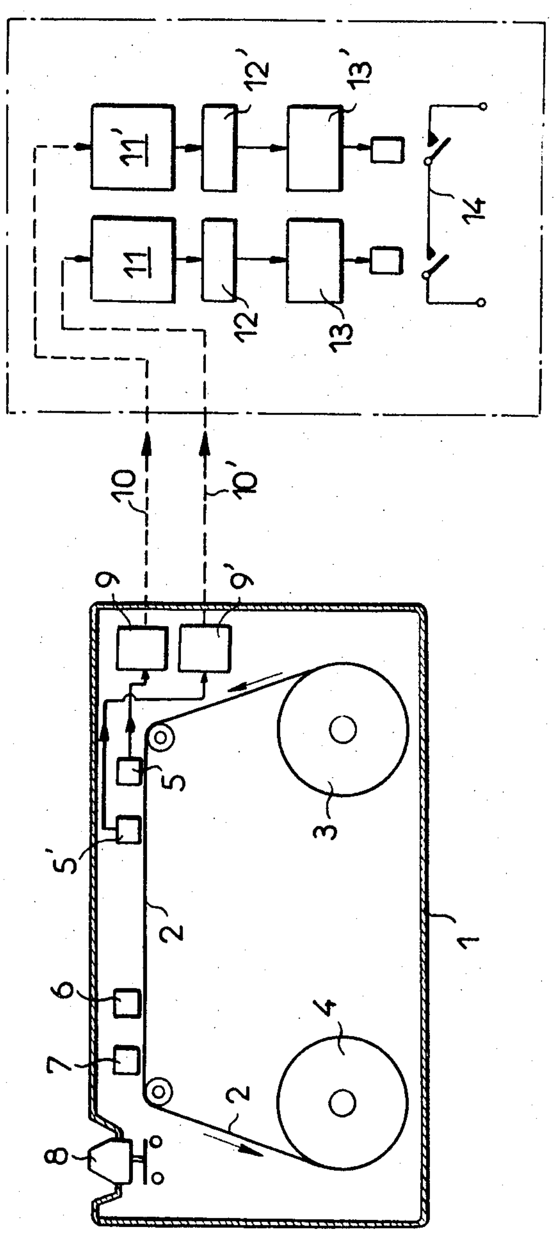
INVENTORS:
CLAUDE. A. BEDJAI
PIERRE N. ANTOINE
By: Mc Glew & Toren
Attorneys

ELECTRONIC REMOTE CONTROL DEVICE UTILIZING MODULATED TRANSMISSION OF MAGNETICALLY RECORDED SIGNALS FILTERED IN A RECEIVER

FIELD AND SUMMARY OF THE INVENTION

The present invention relates t an electronic device for remotely controlling an electrically actuated apparatus, in particular for remotely controlling an apparatus adapted to distribute products in bulk, such as liquids, in continuous fashion.

The invention is more specially directed to the remote control of apparatuses adapted to distribute liquids, such as liquid fuels, and it will be disclosed hereinafter more particularly with regard to such a function.

The invention provides an especially simple, money-saving and efficient solution, not only to the problem of the automatic distribution of liquids (and, more generally, to the control of an apparatus left at the disposal of users for self-service) at the stage of private consumers, but also to the problem of the delivery of liquid products in large amount to retailers, while giving the seller every assurance as regards their solvency, the products are being sold.

The object of the invention is an electronic control device adapted to ensure the starting and working, during a predetermined controlled time-period, of an apparatus left at the consumers'disposal, without requiring the assistance of a special staff, this device being characterized in that it comprises at least one means for transmitting coded signals corresponding to programmed information, the transmitting means being provided with means for controlling the starting and stopping of the signals transmission and with means for restricting the total amount of the signal transmission durations to a predetermined maximum time-period. The transmitting means is rendered independent and adapted to be left at the disposal of private users, and a fixed receiving means cooperates with the transmitting means is adapted to receive the signals transmitted by the latter. The receiving means is provided with means adapted to ascertain that the signals received are in agreement with the code of programmed information and, if such is the case, to close an electric circuit for starting the apparatus at the disposal of users.

According to a preferred embodiment the transmitting means is constituted by an independent casing, or cassette, the size ad weight of which is such that users can move it separately. This casing is internally provided with a device for reading a magnetic tape driven by two spools, viz. a feed-spool and a take-up spool, and on which are recorded signals coded in low frequency. The casing also comprises a device erasing the signals recorded on the tape downstream of the reading device, and relays for transmitting the signals recorded on the magnetic tape to the receiving means.

From a commercial standpoint, the device according to the invention permits to erect a self-service distributing network at a specially low cost-price, since the various part of the several apparatuses are relatively inexpensive, such a network and the corresponding casings thus being at the disposal of a wide range of consumers.

At the same time, at the stage of the distributing firm, the device according to the invention permits to dispense with a numerous staff and frees the firm from the worries of collecting money and transferring funds.

Again from an economic standpoint, it is to be noted that the device according to the invention proves absolutely secure as regards payments, since the locked casing which contain the tape on which are memorized signals, permits the consumer to obtain a predetermined supply which he has necesserily paid for when being given the casing.

Therefore, the amounts to his debit are, in fact, already paid.

It is be easily understood that the signals broadcast by the user's memory casing, comprising two low-frequency signals carried by two high-frequency waves, correspond to a coding which it is indeed impossible to decode by trial and error.

It must also be noted that the device according to the invention can be applied to any apparatus capable of distributing materials in continuous fashion and, broadly speaking, to every apparatus at the public's disposal for self-service. For instance, the invention can be applied to the distribution of domestic fuel stored in large amounts by a private consumer and released by fractions according to his needs. The consumer, at each release, pays for the corresponding amount of fuel and is given a fresh casing which enables him to withdraw a given amount of fuel from his tank.

The invention can also be applied to cars rented without chauffeur, left at the free disposal of users, and which can be started by means of the unwinding of the memory tape of the casing owned by the user.

The object of the invention will more clearly appear from the following description, which is in no way limitative, with reference to the accompanying sole drawing FIGURE which is a diagrammatic view of the device according to the invention.

To the left of the figure is shown a memory casing constituted by a closed and theftproof cassette 1 containing a magnetic tape 2 unwound from a feed spool 3 and wound up on a take-up spool 4.

The magnetic tape 2, which contains signals recorded according to a predetermined code and one which are printed programmed information, successively moves past two reading heads 5 and 5' adapted to detect the low frequency signals recorded on two different tracks of the magnetic tape.

Beyond reading heads 5 and 5', the tape moves past an erase head 6 which de-magnetizes the tracks and deletes the signals recorded on the tracks of the tape. Accessorily, a filtering device 7 erases all random noises and spurious signals, recorded on tape 2 before it is re-wound on take-up spool 4.

The actuation of tape 2 is controlled by knob 8, which it turn actuates a tuning device adapted to actuate the motor for driving take-up spool 4 during a predetermined time-period. It is to be noticed that knob 8 is recessed with respect to the wall of the memory casing, in order to prevent the motor from unexpectedly starting. The low-frequency signals detected by reading heads 5 and 5' are transmitted to transmitters 9 and 9', each of which is adapted to broadcast on a fixed given frequency.

The high-frequency waves diagrammatically represented in the figure by dashed lines 10 and 10' are picked up by receivers 11 and 11', each of which is selectively tuned to the wavelength of one of transmitters 9 and 9'.

High-frequency waves 10 and 10' carry the low-frequency waves transmitted by reading heads 5 and 5'. Receivers 11 and 11' receive waves 10 and 10' and transmit low-frequency waves to the low-frequency portions 12 and 12' of the corresponding receivers. The signals are directed to very selective filters 13 and 13', and the thus filtered weak currents can operate magnetic relays of a known type, with a view to closing circuit 14 which controls the operation of the apparatus, e.g. the fuel distributing electro-valve.

Once tape 2 is fully wound on spool 4, the memory casing is exhausted and no longer transmits any signal, so that after having allowed a given consumption the price of which is already paid, the casing is absolutely unloaded and is no longer in a position to render any service to the user. The latter will then have to take back the unloaded casing to the firm who had supplied it and, against cash, he will be given a re-loaded casing in which a tape 2 re-wound on feed spool 3 will have stored appropriate signals and information adapted to start the distributing apparatus.

The casing can also be so designed as to provide several different services. To this end, it must comprise several knobs, each of which is adapted to control the movement of the magnetic tape at a given speed, the reading of the track comprising, in each instance, the signal which corresponds to a given requested service.

According to another embodiment, the high-frequency transmitters might be replaced by a set of pins located in the casing and adapted to be inserted into openings provided in the receiver and adapted to supply the receiver directly with the signals which permit to actuate it.

What is claimed is:

1. An electronic remote control device operable to activate, for a predetermined maximum time period, a consumer-controlled dispensing apparatus, said device comprising, in combination, a self-contained hand-transportable signalling unit in the form of a sealed compact cassette-type tape recorder, arranged for operation by a consumer, and containing tuned radio signal transmitter means, means storing a series of coded signals having a series length corresponding to said maximum time period and constituting a programmed information, signal transducer means cooperable, when activated, with said storing means to supply the coded signals to said transmitter means for transmission thereby as radio signals, and manually operable control means selectively actuable to activate said storing and transducer means to supply said coded signals to said transmitter means for a selected time period limited to the length of said maximum time period; and stationary receiving means at said apparatus, tuned to said transmitter means to receive said radio signals, having means, including selective filter means, operable to check the received radio signals for agreement with the code of programmed information, and means operable, responsive to such agreement, to close an activating circuit for said apparatus for only the duration of the received radio signals.

2. An electronic remote control device, as claimed in claim 1, in which said storing means includes a motor driven magnetic tape unit controlled by an externally accessible starting button and including a supply reel, a take-up reel and a length of magnetic tape wound on said supply reel for rewinding on said take-up reel; said tape having said series of coded signals recorded thereon; magnetic head reproducing means operatively associated with said tape and connected to said transmitter means; the coded signals recorded on said tape being coded in low frequency; and erase head means cooperable with said tape downstream, in the direction of movement of said tape, from said reproducing head means, and operable to erase the recorded information from said tape after the recorded information has been read out by said reproducing head means; said predetermined maximum time period length being set by the length of said tape having said series of coded signals recorded thereon.

3. An electronic remote control device, as claimed in claim 2, in which said tuned radio signal transmitter means comprises at least one crystal-controlled high frequency transmitter tuned to a predetermined wave length; said receiving means including at least one receiver tuned to the high frequency broadcast by a transmitter of said signalling unit.

4. An electronic remote control device, as claimed in claim 2, said tape having two sound tracks thereon; two reading heads, each cooperable with a respective track to transduce the low frequency signals read on the track and supply the same to said transmitter means; said transmitter means comprising two crystal-controlled high frequency transmitters, each connected to a respective reading head; the low frequency signals from each reading head having supplied as modulations to the high frequency carrier waves of the associated transmitter; said receiving means comprising two high frequency receivers each tuned to the carrier frequency of a respective high frequency transmitter and constructed and arranged to detect and demodulate the low frequency signals carried by the respective high frequency carrier; said selective filter means comprising a pair of selective filters each connected to a respective high frequency receiver and each tuned to the frequency of the respective low frequency signals; said means operable to close an activating circuit for said apparatus comprising two relays, each connected to the output of a respective filter, and each controlling a respective switch in said activating circuit.

* * * * *